(12) United States Patent
Mizutani

(10) Patent No.: US 11,010,647 B2
(45) Date of Patent: May 18, 2021

(54) INKJET RECORDING DEVICE AND INKJET RECORDING METHOD

(71) Applicant: KONICA MINOLTA, INC., Tokyo (JP)

(72) Inventor: Toshiyuki Mizutani, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/493,809

(22) PCT Filed: Jan. 19, 2018

(86) PCT No.: PCT/JP2018/001523
§ 371 (c)(1),
(2) Date: Sep. 13, 2019

(87) PCT Pub. No.: WO2018/168192
PCT Pub. Date: Sep. 20, 2018

(65) Prior Publication Data
US 2020/0016895 A1    Jan. 16, 2020

(30) Foreign Application Priority Data

Mar. 16, 2017    (JP) .............................. JP2017-050725

(51) Int. Cl.
*G06K 15/10* (2006.01)
*B41J 2/21* (2006.01)
(Continued)

(52) U.S. Cl.
CPC ............ *G06K 15/107* (2013.01); *B41J 2/145* (2013.01); *B41J 3/543* (2013.01); *B41J 29/38* (2013.01); *B41J 2202/20* (2013.01)

(58) Field of Classification Search
CPC ..................................................... B41J 2/2132
See application file for complete search history.

(56) References Cited

U.S. PATENT DOCUMENTS

| 6,461,417 B1 * | 10/2002 | Malhotra | ............... C09D 11/34 |
| | | | 106/31.29 |
| 2004/0218200 A1 * | 11/2004 | Ebihara | ................ H04N 1/4015 |
| | | | 358/1.9 |

(Continued)

FOREIGN PATENT DOCUMENTS

| JP | 2011116096 A | 6/2011 |
| WO | WO-2015152177 A1 * | 10/2015 ........... C09D 11/322 |

OTHER PUBLICATIONS

English language translation of International Preliminary Report on Patentability (Form PCT/IB/373) dated Sep. 17, 2019, in corresponding International Application No. PCT/JP2018/001523. (8 pages).

(Continued)

*Primary Examiner* — Shelby L Fidler
(74) *Attorney, Agent, or Firm* — Buchanan Ingersoll & Rooney PC

(57) ABSTRACT

An inkjet recording device including: a recorder; a mover; and a hardware processor, wherein a pair of recording heads having recording elements in overlapping arrangement ranges in a width direction are at positions different in one movement direction orthogonal to the width direction, ink changes the phase to a solid in a time shorter than a difference between times when the ink adheres to a same position in the one movement direction, the hardware processor performs recording control of causing a selected recording element to perform an output operation to each position in the one movement direction and determines an execution order of output operations such that the output operation by each of downstream-side recording elements is performed twice or more continuously and at least a part of the output operations by upstream-side recording elements is not continuous.

6 Claims, 6 Drawing Sheets

(51) Int. Cl.
*B41J 3/54* (2006.01)
*B41J 2/145* (2006.01)
*B41J 29/38* (2006.01)

(56) References Cited

U.S. PATENT DOCUMENTS

2010/0182367 A1* 7/2010 Takagi .................. B41J 2/2132
 347/14
2018/0272745 A1* 9/2018 Ichioka ................... B41J 2/155

OTHER PUBLICATIONS

International Search Report (PCT/ISA/210) dated Feb. 20, 2018, by the Japan Patent Office as the International Searching Authority for International Application No. PCT/JP2018/001523.
Written Opinion (PCT/ISA/237) dated Feb. 20, 2018, by the Japan Patent Office as the International Searching Authority for International Application No. PCT/JP2018/001523.

* cited by examiner

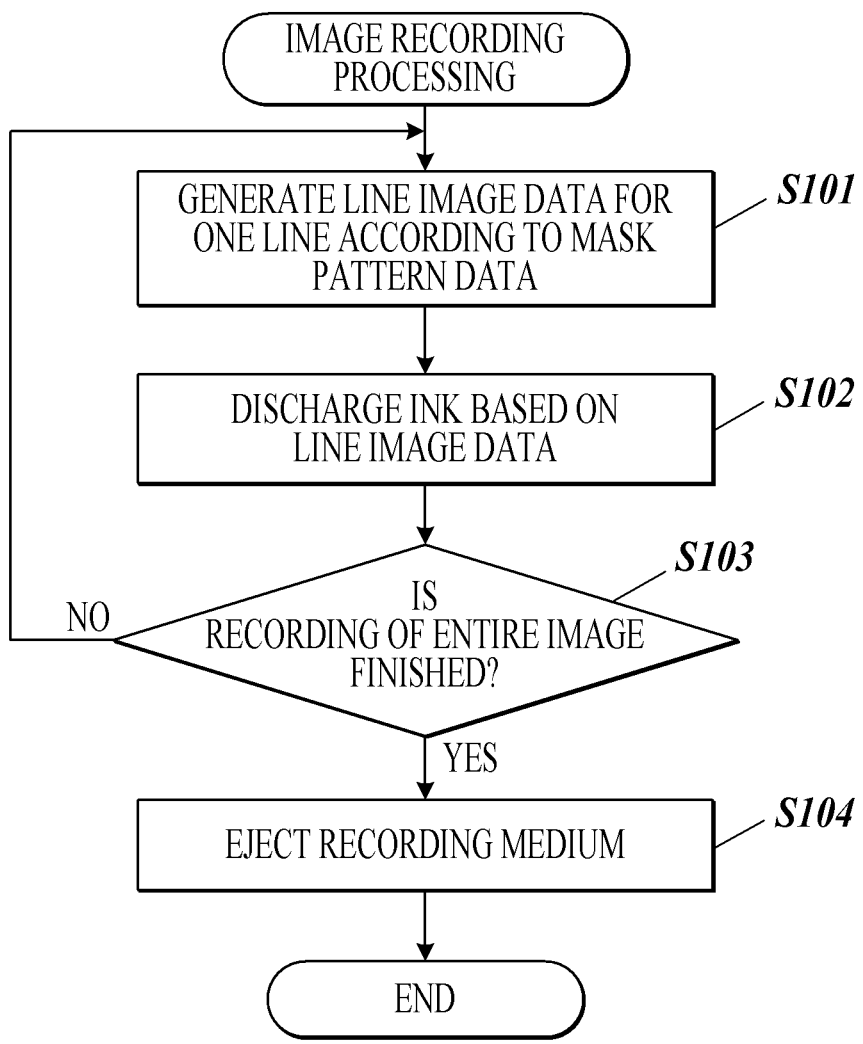

INKJET RECORDING DEVICE AND INKJET RECORDING METHOD

TECHNICAL FIELD

The present invention relates to an inkjet recording device and an inkjet recording method.

BACKGROUND ART

There is a conventional inkjet recording device that moves the recording heads each including a plurality of recording elements for discharging ink, relative to a recording medium while the recording elements of the recording heads discharge ink onto the recording medium, and thereby records an image on the recording medium. In order to improve the recording rate, a recent inkjet recording device uses a technique of forming long head units (recording means) each having a plurality of recording heads arranged at different positions along the width direction orthogonal to the direction of the movement relative to the recording medium. The recording heads of the long head units are each provided with recording elements from which ink is discharged for recording of an image. One known type of such long head units has recording heads arranged in a staggered manner such that the arrangement ranges of the recording elements along the width direction in the recording heads partially overlap each other.

An inkjet recording device including such long head units uses a known technique to suppress the generation of discontinuity in density at the connection portion of the plurality of recording heads by causing the recording heads to complementarily perform an output operation that is a discharging operation or a non-discharging operation of ink from the recording elements located at positions that are corresponding in the width direction in the recording heads, in the overlapping range where the arrangement ranges of the recording elements of the recording heads overlap each other. In the technique, by causing each of the recording elements located at corresponding positions in the width direction to continuously perform the output operation a plurality of times, the driving frequency of the recording elements can be made even and the discharge property of ink can be stabilized in the overlapping range (for example, Patent Literature 1).

Various properties of ink to be used in the inkjet recording device have been developed. Examples of such ink include a phase change ink which is solidified and fixed to the recording medium immediately after adhering to the recording medium in a liquid state. The image which was recorded by the inkjet recording device using the phase change ink changes the gloss state according to the surface shape of the ink solidified on the recording medium. It is possible to control the gloss of the recorded image by using this property.

In the above overlapping range in the long head unit having the recording heads arranged in a staggered manner, the timings to discharge ink by a pair of recording heads (by recording heads which are a pair of recording heads) to each position on the recording medium are different from each other. Thus, when the above-mentioned phase change ink is used, the ink which was discharged earlier by the recording elements (upstream-side recording elements) of the recording head located on the upstream side in the relative movement direction of the recording medium gets spread and solidified, and thereafter ink which is discharged by the recording elements (downstream-side recording elements) of the recording head on the downstream side adheres to the recording medium such that the ink partially overlaps the solidified ink, and becomes solidified. Thus, the surface shape of the ink discharged by the downstream-side recording elements is mainly reflected in the surface shape of the ink in the overlapping range.

CITATION LIST

Patent Literature

Patent Literature 1: JP 2011-116096A

SUMMARY

Technical Problem

However, when the recording element of each of the pair of recording heads performs the output operation continuously a plurality of times in the overlapping range, the freedom degree of the ink discharge pattern by each of the upstream-side recording element and the downstream-side recording element is low. Thus, it is not possible to make the surface shape of the ink discharged by the downstream-side recording element in the overlapping range be close to the surface shape when the ink is discharged by the recording element of the same recording head in the non-overlapping range which is other than the overlapping range. Thus, the difference in gloss of the recorded image easily occurs between the overlapping range and the non-overlapping range.

An object of the present invention is to provide an inkjet recording device and an inkjet recording method which can suppress unevenness in gloss of an image recorded by a long recording means which has a plurality of recording heads.

Solution to Problem

In order to achieve the above object, the invention of the inkjet recording device according to claim 1 includes a recording means that discharges ink, which changes a phase between a solid and a liquid, to a recording medium from a plurality of recording elements that are provided in each of a plurality of recording heads; a moving means that moves the recording medium and the plurality of recording heads relative to each other; and a recording control means that performs recording control of causing each of the plurality of recording elements provided in each of the plurality of recording heads to sequentially perform an output operation that is a discharging operation or a non-discharging operation of the ink to each position in predetermined one movement direction of the recording medium while the recording control means causes the moving means to move the recording medium relative to the plurality of recording heads in the one movement direction, wherein the plurality of recording elements are provided at an even arrangement interval in a width direction orthogonal to the one movement direction in each of the plurality of recording heads, each of the plurality of recording heads is arranged such that an arrangement range in the width direction of the recording elements overlaps, in a predetermined neighborhood range from an end of the arrangement range, with an arrangement range of recording elements in another recording head, and a pair of recording heads having recording elements in overlapping arrangement ranges in a neighborhood range are located at positions different from each other in the one movement direction, the ink that is discharged by the recording means and adheres to the recording medium changes the phase to the solid in a time shorter than a difference between times when the ink, which is discharged from the recording elements belonging to respective recording heads of the pair of recording heads, adheres to a same position in the one movement direction on the recording medium in the recording control, the recording control means selects a recording element among recording elements at corresponding positions in the width direction in the respective recording heads of the pair of recording heads and performs the recording control of causing the selected recording element to perform the output operation to each position in the one movement direction of the recording medium in a predetermined set range in the width direction in the neighborhood range, and in the recording control, the recording control means determines an execution order of output operations by downstream-side recording elements and upstream-side recording elements at corresponding positions in the width direction such that the output operation by each of the downstream-side recording elements is performed twice or more continuously and at least a part of the output operations by the upstream-side recording elements is not continuous, the downstream-side recording elements belonging to the recording head located on a downstream side in the one movement direction among the pair of recording heads, and the upstream-side recording elements belonging to the recording head located on an upstream side in the one movement direction among the pair of recording heads.

The invention according to claim 2 is the inkjet recording device according to claim 1, wherein the recording control means selects the recording element to perform the output operation such that an operation rate, which is a rate of the output operation performed by a recording element in one recording head among the pair of recording heads, simply increases in the neighborhood range according to increase in a distance from an end of the neighborhood range in the one recording head.

The invention according to claim 3 is the inkjet recording device according to claim 1 or 2, wherein the recording control means switches, at a different timing, the recording element to perform the output operation at each of positions adjacent in the width direction in the set range.

The invention according to claim 4 is the inkjet recording device according to any one of claims 1 to 3, wherein the recording control means determines the execution order of the output operations such that a first adhering position and any second adhering position other than the first adhering position are located in a distance range where the ink that adheres to the first adhering position and the ink that adheres to the second adhering position are combined with each other, the first adhering position being a position to which the ink adheres on the recording medium when the ink is discharged by the output operation that is not continuous by an upstream-side recording element, and the second adhering position being a position to which the ink adheres by the output operation of any of the upstream-side recording elements.

The invention according to claim 5 is the inkjet recording device according to any one of claims 1 to 4, wherein the recording control means causes the moving means to move the recording medium and the plurality of recording heads relative to each other at a relative movement speed that makes a time, which is required for relative movement of a position opposing an ink discharging port of the upstream-side recording element on the recording medium to a position opposing an ink discharging port of the downstream-side recording element along the one movement direction, longer than a time until a phase change to the solid of the ink that is discharged by the upstream-side recording element and adheres to the recording medium.

In order to achieve the above object, the invention of the inkjet recording method according to claim 6 is an inkjet recording method by an inkjet recording device that includes: a recording means that discharges ink, which changes a phase to a solid immediately after adhering to a recording medium, from a plurality of recording elements that are provided in each of a plurality of recording heads to the recording medium; and a moving means that moves the recording medium and the plurality of recording heads relative to each other, the method including: a recording step that is performing recording control of causing each of the plurality of recording elements provided in each of the plurality of recording heads to sequentially perform an output operation that is a discharging operation or a non-discharging operation of the ink to each position in predetermined one movement direction of the recording medium while causing the moving means to move the recording medium relative to the plurality of recording heads in the one movement direction, wherein the plurality of recording elements in the inkjet recording device are provided at an even arrangement interval in a width direction orthogonal to the one movement direction in each of the plurality of recording heads, each of the plurality of recording heads in the inkjet recording device is arranged such that an arrangement range in the width direction of the recording elements overlaps, in a predetermined neighborhood range from an end of the arrangement range, with an arrangement range of recording elements in another recording head, and a pair of recording heads having recording elements in overlapping arrangement ranges in a neighborhood range are located at positions different from each other in the one movement direction, the ink that is discharged by the recording means and adheres to the recording medium changes the phase to the solid in a time shorter than a difference between times when the ink, which is discharged from the recording elements belonging to respective recording heads of the pair of recording heads, adheres to a same position in the one movement direction on the recording medium in the recording control, in the recording step, a recording element among recording elements at corresponding positions in the width direction in the respective recording heads of the pair of recording heads is selected, and the recording control is performed to cause the selected recording element to perform the output operation to each position in the one movement direction of the recording medium in a predetermined set range in the width direction in the neighborhood range, and in the recording control in the recording step, an execution order of output operations by downstream-side recording elements and upstream-side recording elements at corresponding positions in the width direction is determined such that the output operation by each of the downstream-side recording elements is performed twice or more continuously and at least a part of the output operations by the upstream-side recording elements is not continuous, the downstream-side recording elements belonging to the recording head located on a downstream side in the one movement direction among the pair of recording heads, and the upstream-side recording elements belonging to the recording head located on an upstream side in the one movement direction among the pair of recording heads.

Advantageous Effects of Invention

According to the present invention, there is an effect that it is possible to suppress the unevenness in gloss in the image recorded by a long recording means having a plurality of recording heads.

BRIEF DESCRIPTION OF DRAWINGS

FIG. 6 is a flowchart illustrating a control procedure of image recording processing.

DESCRIPTION OF EMBODIMENTS

An embodiment of the inkjet recording device and an inkjet recording method according to the present invention will now be described with reference to the accompanying drawings.

Figure 1:
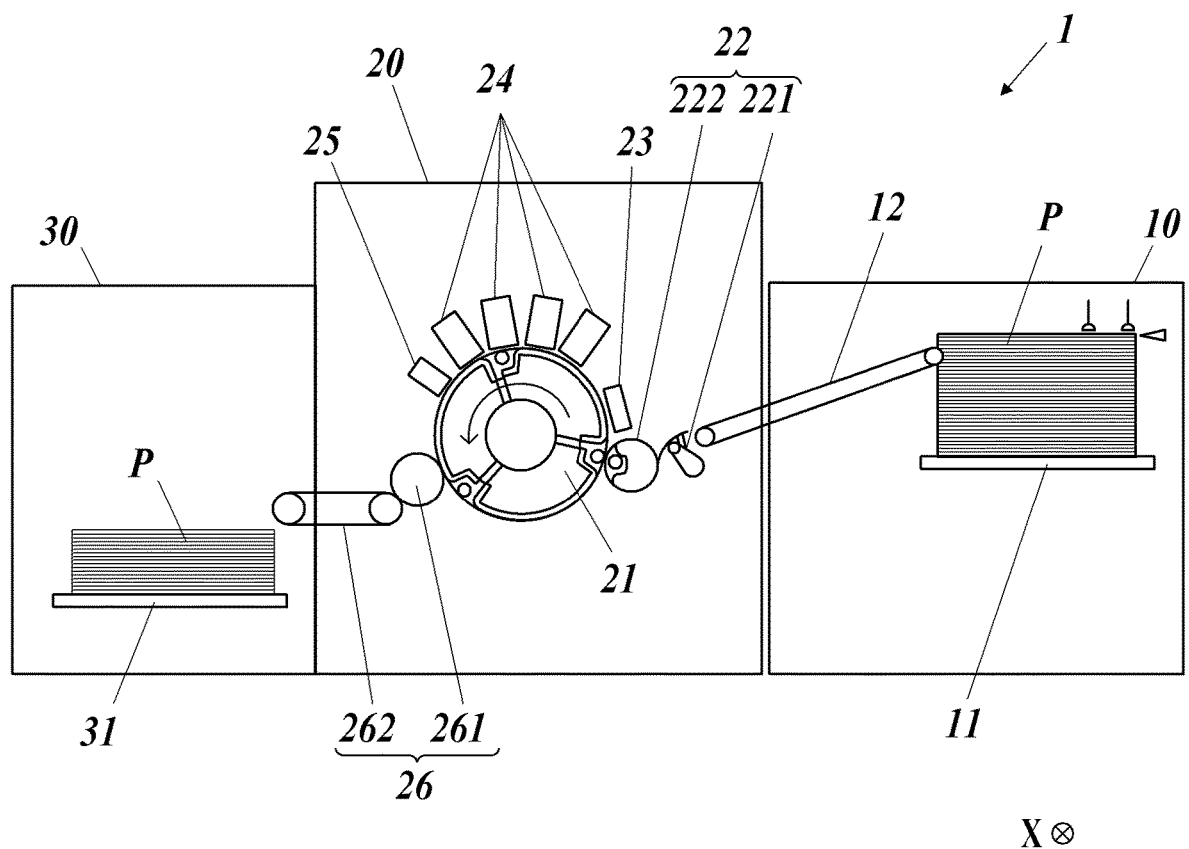
FIG. 1 is a view illustrating a schematic configuration of an inkjet recording device according to an embodiment of the present invention.

FIG. 1 illustrates a schematic configuration of the inkjet recording device 1 according to an embodiment of the present invention.

Figure 3:
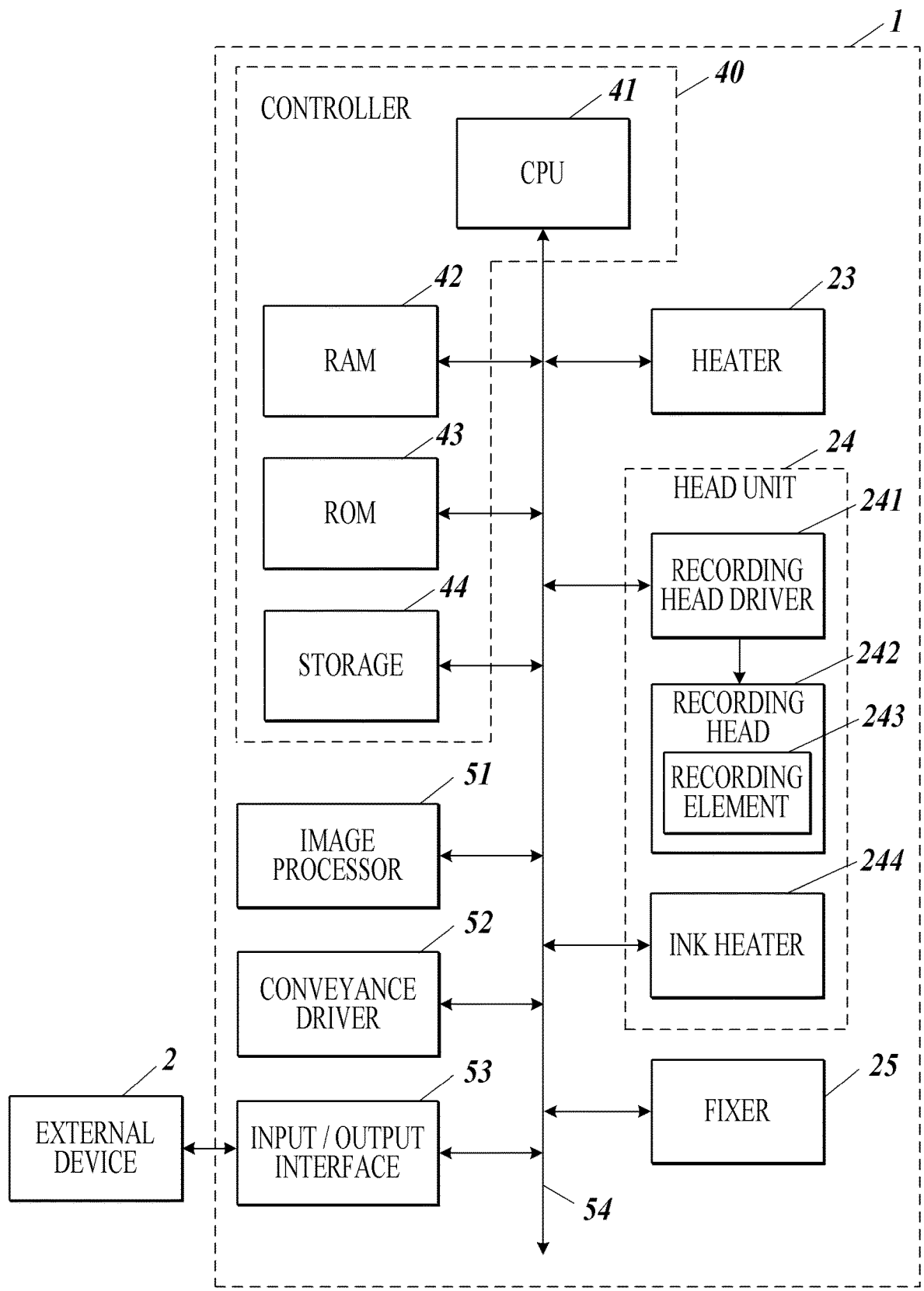
FIG. 3 is a block diagram illustrating the major functional configuration of the inkjet recording device.

The inkjet recording device 1 includes a sheet feeder 10, an image recorder 20, a sheet ejector 30, and a controller 40 (FIG. 3). The inkjet recording device 1 conveys a recording medium P accommodated in the sheet feeder 10 to the image recorder 20, records an image on the recording medium P with the image recorder 20, and conveys the recording medium P with the recorded image to the sheet ejector 30 under control by the controller 40.

Examples of the recording medium P include paper sheets, such as plain paper and coated paper, and other various media, such as cloth and resin sheets, on which a discharged ink can be solidified.

The sheet feeder 10 includes a sheet feeding tray 11 accommodating the recording medium P and a medium carrier 12 conveying the recording medium P from the sheet feeding tray 11 to the image recorder 20. The medium carrier 12 includes a ring belt the inner face of which is supported by two rollers. The recording medium P is placed on the belt and then the rollers are rotated to convey the recording medium P.

The image recorder 20 includes, for example, a conveyance drum 21 (moving means), a hand-over unit 22, a heater 23, head units 24 (recording means), a fixer 25, and a deliverer 26.

The conveyance drum 21 has a cylindrical shape, holds the recording medium P on its outer circumference or a conveyance surface, rotates around the rotation axis extending in the direction (X direction) perpendicular to the drawing plane in FIG. 1, and thus conveys the recording medium P in the conveyance direction (Y direction)(movement direction) on the conveyance surface. The conveyance drum 21 includes a claw and an air-intake (not shown) for holding the recording medium P on the conveyance surface. The recording medium P is stopped by the claw at its end and is attracted by the air-intake onto the conveyance surface for retention.

The conveyance drum 21 is connected to a conveyance drum motor (not shown) for rotating the conveyance drum 21 and is rotated by an angle proportional to the rotation amount of the conveyance drum motor.

The hand-over unit 22 feeds the recording medium P conveyed by the medium carrier 12 in the sheet feeder 10 to the conveyance drum 21. The hand-over unit 22 is arranged between the medium carrier 12 in the sheet feeder 10 and the conveyance drum 21. The hand-over unit 22 holds and receives the recording medium P conveyed from the medium carrier 12 at one end with a swing arm 221 to feed the recording medium P to the conveyance drum 21 via a delivery drum 222.

The heater 23 is arranged between the delivery drum 222 and the head unit 24 to heat the recording medium P conveyed by the conveyance drum 21 to a predetermined range of temperature. The heater 23 includes, for example, an infrared heater that is heated by electric current conducted in response to control signals from a CPU 41 (FIG. 3).

The head units 24 discharge ink onto the recording medium P according to image data at appropriate timing corresponding to the rotation of the conveyance drum 21 holding the recording medium P and thereby records an image. The head units 24 are arranged in predetermined intervals and each have an ink discharge face opposing the conveyance drum 21. In the inkjet recording device 1 of this embodiment, four head units 24 corresponding to four colors, yellow (Y), magenta (M), cyan (C), and black (K), of ink, respectively, are arranged at predetermined intervals in the order of Y, M, C, and K from the upstream in the conveyance direction of the recording medium P.

Figure 2:
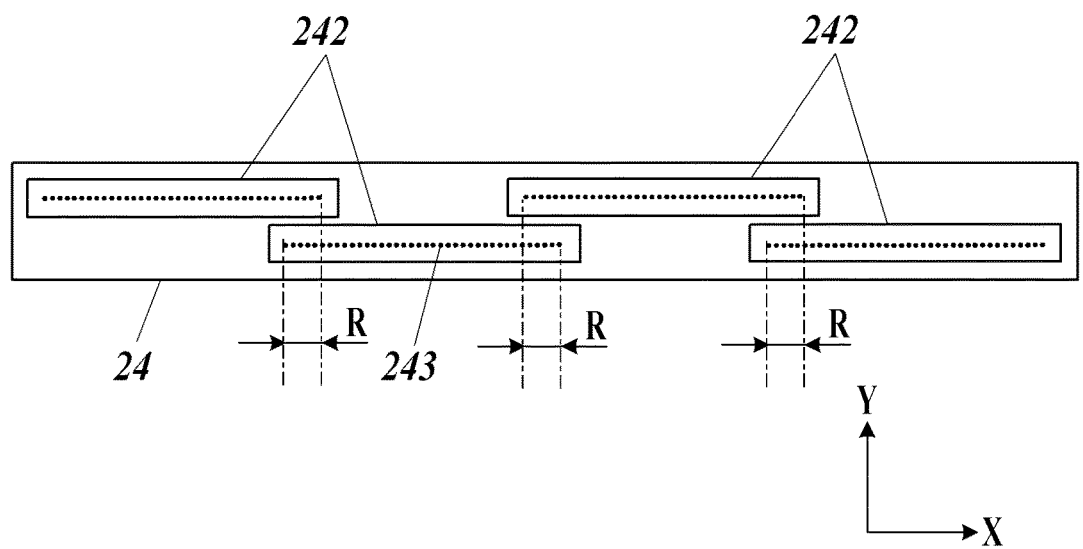
FIG. 2 is a schematic view illustrating a configuration of a head unit.

FIG. 2 is a schematic view illustrating a configuration of the head units 24. This drawing schematically illustrates the positions of openings (ink discharging ports) of nozzles of recording elements 243 provided in the recording heads 242 in a plan view of the head units 24 seen from the side opposing the conveyance surface of the conveyance drum 21.

The head units 24 each includes four recording heads 242 arranged at equal intervals in the direction of the recording elements 243 crossing the conveyance direction of the recording medium P (the width direction orthogonal to the conveyance direction, i.e., the X direction in this embodiment). The arrangement interval in the X direction of the recording elements 243 in the head unit 24 is even and approximately 21 μm. Thus, recording can be made with a resolution of 1200 dpi (dot per inch) in the X direction.

Each of the four recording heads 242 included in the head unit 24 is arranged in a staggered manner to overlap with the arrangement range of the recording elements 243 of another recording head 242 in a predetermined neighborhood range (hereinafter, described as the overlapping range R) at their end(s) of the arrangement range in the X direction of the recording elements 243 in the recording head 242. The pair of recording heads 242 sharing the overlapping range R are arranged in a positional relationship that the positions in the X direction of the recording elements 243 in the respective recording heads 242 match each other in the overlapping range R. In the overlapping range R, the recording elements 243 in the pair of respective recording heads 242 complementarily discharge ink. Ink discharging to the overlapping range R will be described in detail below. Hereinafter, the arrangement range other than the overlapping range R of the recording elements 243 in each recording head 242 will be also referred to as a non-overlapping range.

The arrangement range of the recording elements 243 in the head unit 24 in the X direction covers the width in the X direction of the image recordable region of the recording medium P that is conveyed by the conveyance drum 21. The head units 24 are used at fixed positions when an image is recorded. The head units 24 record an image by a single pass method by sequentially performing the output operations by the recording elements 243 to respective positions at a predetermined interval (conveyance direction interval) in the conveyance direction according to the conveyance of the recoding medium P. The interval in the conveyance direction in the embodiment is the interval to have the recording resolution in the conveyance direction of 1200 dpi. Accordingly, in the inkjet recording device 1 in the embodiment, the interval of the ink dischargeable positions is approximately 21 µm in both of the X direction and the Y direction.

It should be noted that the recording heads 242 may each include two or more arrays of recording elements 243 (nozzle arrays). For example, the recording heads 242 may each include two arrays of recording elements 243 in the X direction, and the recording elements 243 of these two arrays may be shifted from each other by half of the arrangement interval between the recording elements 243 in the X direction. The number of the recording heads 242 included in the head unit 24 may be three or less or five or more.

The head units 24 each include a recording head driver 241 for driving the recording heads 242 (FIG. 3). The recording head drivers 241 each include a driving circuit for applying voltage signals (drive signals) having drive waveforms corresponding to image data to each of the recording heads 242 and a drive control circuit for transmitting image data to the driving circuit at an appropriate timing.

The recording elements 243 in the recording heads 242 each include a pressure chamber for reserving ink, a piezoelectric element provided on the wall of the pressure chamber, and a nozzle. The driving circuit in the recording head driver 241 outputs a drive signal that causes the piezoelectric element to be deformed. In the recording element 243, the voltage signal is applied to the piezoelectric element. When the drive signal is applied to the piezoelectric element, according to the voltage signal, the pressure chamber is deformed and thus the pressure in the pressure chamber is changed. The change in pressure causes ink to be discharged from the nozzle in communication with the pressure chamber. If the pixel value of image data corresponds to non-discharging of the ink, a drive signal for causing the recording element 243 to perform the non-discharging operation of not discharging ink from the nozzle is supplied to the recording element 243. The non-discharging operation is the operation of vibrating meniscus in the range not discharging the ink droplet from the nozzle in order to maintain the ink surface (meniscus) in the nozzle opening in a state appropriate for the ink discharging, for example. In such a way, the recording element 243 performs the output operation that is the discharging operation of discharging ink of the amount corresponding to the pixel value of image data from the nozzle or the non-discharging operation, according to the drive signal. In the embodiment, the drive signal is adjusted such that the liquid amount of ink droplet discharged from the recording element 243 according to the drive signal is the liquid amount of spreading in a circle of a diameter of approximately 40 to 60 [µm] after adhering to the recording medium P.

The ink discharged from the nozzles of the recording elements 243 is ink changing a phase (phase transition) between a solid and a liquid. This embodiment uses ink involving phase transition between gel and sol according to the temperature and being hardened by irradiation with energy rays, such as ultraviolet rays. Gel is classified into solid, and sol into liquid. More in detail, gel is a solidified or semi-solidified state along with the rapid increase in viscosity and remarkable increase in elasticity, having a structure in which solutes losing independent motility aggregates, by interactions of lamella structure, polymer network of covalent bond and hydrogen bond, polymer network formed by physical aggregation, aggregation structure of micro particles and the like.

Gelling agent is added to the ink in the embodiment. The gelling agent is a compound which can form gel when added to another compound. Various types of known gelling agents can be used. By adjusting the type and density of the gelling agent in the ink, the ink is adjusted such that the phase transition to sol occurs at a predetermined meltdown temperature or more which is higher than a normal temperature, and the phase transition to gel occurs at a predetermined gel transition temperature or less which is higher than the normal temperature.

Each head unit 24 includes an ink heater 244 (FIG. 3) (ink heating means) for heating the ink reserved in the head unit 24. The ink heater 244 operates under the control of the CPU 41 in FIG. 3 and heats the ink to a temperature at which the ink is converted to sol. The recording heads 242 discharge the heated sol ink. If sol ink is discharged to the recording medium P, immediately after the droplets of the ink reach the recording medium P, the ink is spontaneously cooled. Thus, the ink becomes promptly gel and changes the phase to solid (solidification) on the recording medium P without a substantial reduction in volume. Solidification on the recording medium P in this context indicates solidification in a state in which at least some droplets of the ink reaching the recording medium P keeps their original shapes to some degree before penetration into the recording medium P, in other words, solidification in a state in which the surface shape is different from that of the recording medium P. The surface of ink solidified in this state scatters incident light depending on their surface shapes. In the embodiment, the recording element discharges such ink of a property and a temperature that is solidified in approximately 50 to 100 milliseconds after adhering to the recording medium P.

The fixer 25 has a light emitter arranged over the width of the conveyance drum 21 in the X direction. The fixer 25 emits energy rays, such as ultraviolet rays, from the light emitter toward the recording medium P placed on the conveyance drum 21 to harden the ink discharged onto the recording medium P for fixing. The light emitter of the fixer 25 is arranged to face the conveyance drum 21 on the downstream side in the conveyance direction of the arrangement position of the head unit 24 in the conveyance direction.

The deliverer 26 includes a belt loop 262 the inner face of which is supported by two rollers and a cylindrical delivery drum 261 for handing over the recording medium P from the conveyance drum 21 to the belt loop 262. The deliverer 26 conveys the recording medium P received from the conveyance drum 21 onto the belt loop 262 via the delivery drum 261 and feeds the recording medium P to the sheet ejector 30 via the belt loop 262.

The sheet ejector 30 includes a platy sheet ejection tray 31 on which the recording medium P fed from the image recorder 20 by the deliverer 26 is placed.

FIG. 3 is a block diagram illustrating the major functional configuration of the inkjet recording device 1.

The inkjet recording device 1 includes, for example, a controller 40 including a CPU 41 (central processing unit) (recording control means), a RAM 42 (random access memory), a ROM 43 (read only memory), and a storage 44, a heater 23, a recording head driver 241 for driving a recording head 242 in a head unit 24, an ink heater 244, a fixer 25, a conveyance driver 52, an input/output interface 53, and a bus 54.

The CPU 41 reads control programs and setting data in the ROM 43, stores them in the RAM 42, and executes the programs for various arithmetic operations. In this manner, the CPU 41 comprehensively controls the overall operation of the inkjet recording device 1. For example, the CPU 41 causes each component in the image recorder 20 to operate on the basis of the image data stored in a memory 44 to record an image on the recording medium P.

The RAM 42 provides a memory space for work to the CPU 41 and stores temporary data. The RAM 42 may include a non-volatile memory.

The ROM 43 stores, for example, various control programs to be executed by the CPU 41 and setting data. The setting data includes masking pattern data, which will be described below. The masking pattern data may be stored in the storage 44. It should be noted that the ROM 43 may be replaced with rewritable non-volatile memories, such as an electrically erasable programmable read only memory (EEPROM) and a flash memory.

The storage 44 stores a print job (image recording instruction) input from an external device 2 via the input/output interface 53, image data associated with the print job, image data after image processing by the image processor 51 to various types of image data, and the like. For example, the storage 44 may be a hard disk drive (HDD), and a dynamic random access memory (DRAM) may also be used in combination.

The recording head driver 241 causes the recording head 242 to discharge ink on the basis of control signals and image data transmitted from the CPU 41. In detail, in response to control signals including image data transmitted from the CPU 41, a drive control circuit in the recording head driver 241 allows a driving circuit to output a voltage signal with a drive waveform among a plurality of patterns of drive waveforms to a piezoelectric element in the recording element 243 of the recording head 242.

The ink heater 244 includes heating wires and causes electric current to be conducted through the wires to heat the wires on the basis of control signals from the CPU 41 and thereby heats ink.

The image processor 51 performs predetermined image processing to image data stored in the storage 44 and stores the image data after image processing in the storage 44, under control by the controller 40. The image processing performed by the image processor 51 includes, rasterizing processing of converting the PDL (Page Description Language) data which is input from the external device 2 and stored in the storage 44 into the raster format, halftone processing of converting the image data of multiple tones (for example, 8 bit 256 tone) into image data of 1 bit (two tones) for each pixel, and the like. The method of halftone processing is not especially limited. However, there can be used a systematic dither method of binarizing the tone value of each pixel according to each of thresholds arranged in a matrix (dither matrix), error diffusion method of assigning the error generated in the binarizing processing of the tone value of each pixel to surrounding pixels, and the like.

The image processor 51 may be configured to perform color conversion processing, tone correction processing and the like, in addition to the above image processing.

The conveyance driver 52 transmits driving signals to a conveyance drum motor in the conveyance drum 21 on the basis of control signals from the CPU 41 and causes the conveyance drum 21 to rotate at a predetermined rate and timing. On the basis of control signals from the CPU 41, the conveyance driver 52 transmits driving signals for operating a medium carrier 12, a hand-over unit 22, and a deliverer 26 to the motor and causes the recording medium P to be fed to and ejected from the conveyance drum 21.

The input/output interface 53 is a means for transmitting/receiving the data to/from the external device 2 and includes, for example, various serial interfaces, various parallel interface, or combinations thereof.

The bus 54 provides a path for transmitting/receiving signals between the controller 40 and other components.

The external device 2 is, for example, a personal computer and transmits, for example, a print job and image data to the controller 40 via the input/output interface 53.

Next, the image recording operation of the inkjet recording device 1 will be described.

In the inkjet recording device 1 in the embodiment, when the raster format image data according to the print job is input from the external device 2 (or converted from the PDL format data by the rasterizing processing of the image processor 51) and stored in the storage 44, halftone processing to the image data by the image processor 51 is performed and the halftone image data is generated. By performing the output operation by the recording element 243 in the head unit 24 on the basis of the halftone image data, an image is recorded on the recording medium P.

The expression method of halftone in the halftone image data is the digital half toning expressing the halftone according to the number of dots formed per unit area. In the inkjet recording device 1, according to the pixel value of 1 bit of halftone image data, discharging or non-discharging of ink in each output operation by the recording element 243 is determined, and the output operation is performed by each of the recording elements 243 on the basis of the halftone image data. Thereby, an image is recorded by the digital half toning using the dots formed on the recording medium P by the ink discharging.

The gloss of the surface of the recording medium P on which the image was formed by the inkjet recording device 1 changes according to the surface shape of ink after the ink was solidified and fixed on the recording medium P. The image which is too glossy causes a feeling of strangeness and is normally not preferable. Thus, in the inkjet recording device 1 in the embodiment, the discharging pattern of ink is adjusted such that the ink surface shape gets moderately rough (that is, such that the surface roughness becomes moderately high). In detail, the gloss is suppressed within an appropriate range by adjusting the arrangement pattern of dot in the halftone processing by the image processor 51.

Hereinafter, the relationship between the ink discharging pattern and the ink shape and gloss will be described.

FIGS. 4A to 4F are views for explaining the difference in ink shape after solidification according to the ink discharging pattern.

Figure 4A:
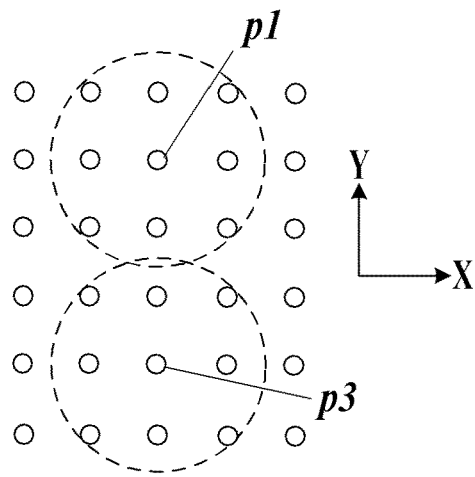
FIG. 4A is a view illustrating spread ranges of the ink droplets adhering to respective ink dischargeable positions located every third positions in the Y direction.
Figure 4B:
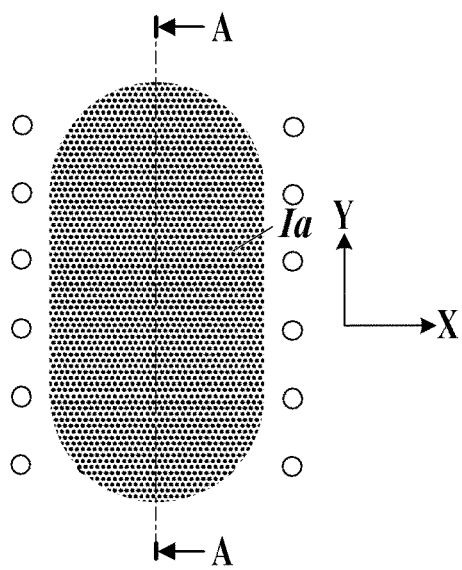
FIG. 4B is a view illustrating a spread range of the ink droplets adhering to respective ink dischargeable positions located every third positions in the Y direction and combined with each other.
Figure 4C:
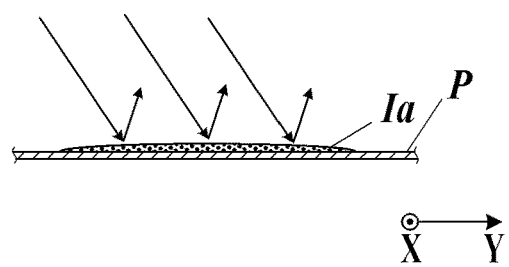
FIG. 4C is a sectional view along the A-A line in FIG. 4B of the ink after the ink was solidified.

FIGS. 4A to 4C are views for explaining the solidified state of ink which adhered to the ink dischargeable positions p1, p3 located every third positions in the Y direction.

As shown in FIG. 4A, the two ink droplets which were discharged respectively to the ink dischargeable positions p1, p3 spread in the ranges of circles each of which has the diameter of approximately three times the interval of the ink dischargeable positions as shown by the circles of dot lines. As a result, the two ink droplets are combined into an ink Ia, and is solidified while spreading in the range shown by the dots in FIG. 4B. The ink Ia which was solidified in such a way is solidified while spreading in a wide range in the Y direction as shown in the sectional view of FIG. 4C (sectional view along the A-A line in FIG. 4B). Thus, the thickness at each position of the ink Ia is nearly even and a small value, and the surface is relatively flat. As a result, the diffusion range of the reflected light of the light which was incident on the surface of the ink Ia becomes narrow, and the gloss in the recorded image becomes large in the region where the ink Ia is solidified.

Figure 4D:
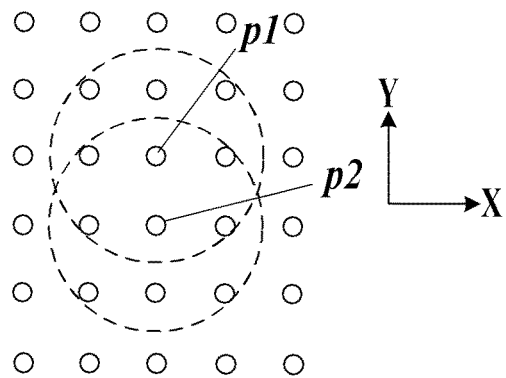
FIG. 4D is a view illustrating spread ranges of the ink droplets adhering to respective ink dischargeable positions which are adjacent in the Y direction.
Figure 4E:
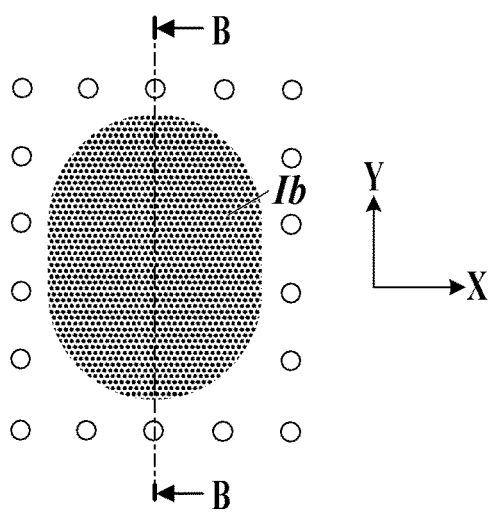
FIG. 4E is a view illustrating a spread range of the ink droplets adhering to respective ink dischargeable positions which are adjacent in the Y direction and combined with each other.
Figure 4F:
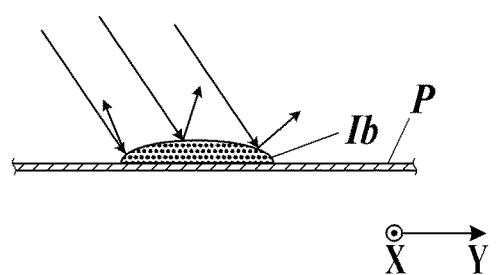
FIG. 4F is a sectional view along the B-B line in FIG. 4E of the ink after the ink was solidified.

FIGS. 4D to 4F are views for explaining the solidified state of the ink adhering to the ink dischargeable positions p1, p2 which are adjacent to each other in the Y direction.

As shown in FIG. 4D, the two ink droplets which were discharged to the ink dischargeable positions p1, p2 spread in the ranges indicated by the circles of dot line. As a result, the two ink droplets are combined into an ink Ib, and solidified while being distributed in the range shown by the dots in FIG. 4E. The range in the Y direction where the ink Ib spreads is narrower than the range where the ink Ia shown in FIG. 4B spreads. The ink Ib which is solidified in such a narrow range is in a shaped more raised from the surface of the recording medium P compared to the ink Ia as shown in the sectional view in FIG. 4F (sectional view along the B-B line in FIG. 4E). Thus, the diffusion range of the reflected light of the light incident on the surface of the ink Ib becomes large. As a result, the gloss in the recorded image becomes small in the region where the ink Ib is solidified compared to the region where the ink Ia is solidified.

In the halftone processing in the embodiment, as shown in FIGS. 4D to 4F, the ink adheres to the ink dischargeable positions which are adjacent to each other in a local range, and the pattern of the halftone processing is set so as to increase the appearance frequency of the discharging pattern (hereinafter, referred to as the high diffusion discharging pattern) such that the ink is solidified in a state in which the ink is highly raised. For example, in the dither matrix used in the above-mentioned systematic dither method, by arranging the thresholds such that the pair of thresholds which are close in value are adjacent in the local range, it is possible to increase the appearance frequency of the high diffusion discharging pattern. By making the appearance frequency of the high diffusion discharging pattern high in such a way, it is possible to suppress the gloss of the recorded image appropriately and record an image with a high image quality reducing the feeling of strangeness.

Next, the output operations by the recording elements 243 in the overlapping range R in the inkjet recording device 1 in the embodiment will be described.

In the inkjet recording device 1 in the embodiment, the above-mentioned halftone image data is divided into a plurality of pieces of partial image data corresponding to each of the recording heads 242, the ink discharging based on the partial image data is performed by each of the recording heads 242 of the head unit 24, and thereby an image is recorded.

In the overlapping range R where the arrangement ranges of the recording elements 243 in a pair of recording heads 242 overlap each other in the X direction, the above-mentioned output operations are performed complementarily by the recording elements 243 belonging to each of the pair of recording heads 242. In detail, masking is performed complementarily to the region corresponding to the overlapping range R in a pair of pieces of partial image data corresponding to the pair of recording heads 242. Then, the ink discharging based on each piece of partial image data is performed by each of the head units 24.

Hereinafter, among the pair of the recording heads 242, the recording head 242 on the downstream side in the conveyance direction which performs the output operation at a later timing to a same position in the conveyance direction on the recording medium P is also referred to as the downstream-side recording head, and the recording head 242 on the upstream side in the conveyance direction is also referred to as the upstream-side recording head.

Figure 5:
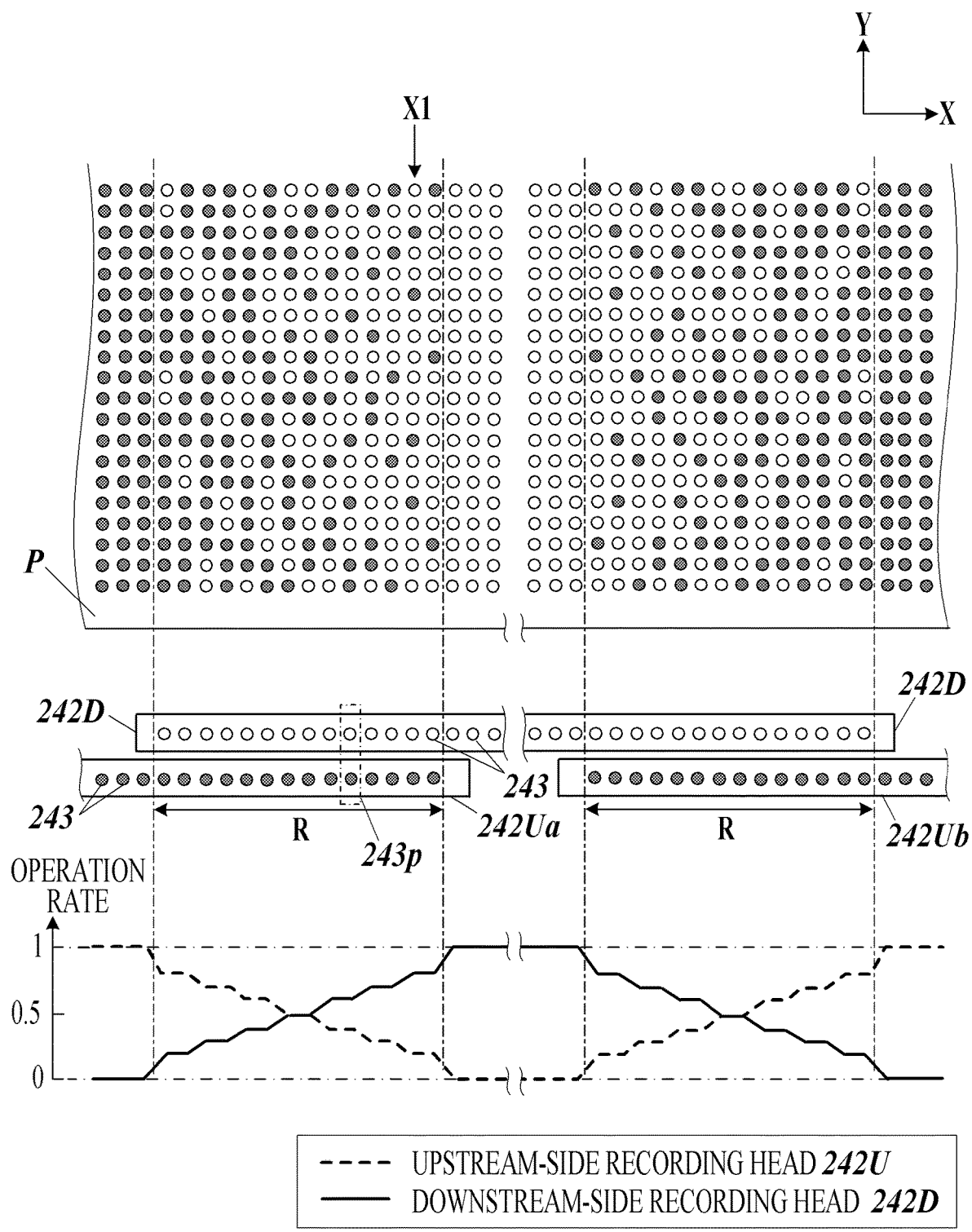
FIG. 5 is a view illustrating an example of the complementary output operations and the operation rates in the overlapping range.

FIG. 5 is a view showing an example of the complementary output operations and the operation rates in the overlapping ranges R.

The upper section of FIG. 5 shows a plan view of one downstream-side recording head 242D and two upstream-side recording heads 242Ua, 242Ub (hereinafter, also collectively described as upstream-side recording heads 242U) in each of which the arrangement range in the X direction of the recording elements 243 partially overlaps that of the downstream-side recording head 242D, and the recording medium P to which the ink is discharged by these recording heads 242, which are seen from the side opposing the conveyance surface of the conveyance drum 21. This plan view schematically shows the nozzle positions of the recording elements 243 in the upstream-side recording heads 242U by the circles filled with dots, and schematically shows the nozzle positions of the recording elements 243 in the downstream-side recording head 242D by the blank circles. This plan view also shows the positions where the output operations by the recording elements 243 in the upstream-side recording heads 242U are performed by the circles filled with dots, and shows the positions where the output operations are performed by the recording elements 243 in the downstream-side recording head 242D by the blank circles, among the positions (ink dischargeable positions) where the recording elements 243 in the upstream-side recording heads 242U and the downstream-side recording head 242D can perform the output operations on the recording medium P. Hereinafter, a pair of recording elements located at corresponding positions in the X direction (that is, located at positions which are closest in the X direction) among the recording elements 243 of the upstream-side recording head 242U (hereinafter, also referred to as the upstream-side recording elements) and the recording elements 243 of the downstream-side recording head 242D (hereinafter, also referred to as the downstream-side recording elements) in the overlapping range R (set range) are referred to as a recording element pair 243p.

As shown in the upper section of FIG. 5, in the embodiment, each of the recording elements 243 which are the upstream-side recording elements and the downstream-side recording elements forming recording element pairs 243p performs the output operation complementarily to each ink dischargeable position in the Y direction. The output operation by the downstream-side recording element is always performed continuously to the two or more ink dischargeable positions which are adjacent in the Y direction. On the other hand, for at least a part of the upstream-side recording elements, a part of the output operations is not performed continuously or none of the output operations is performed continuously to the ink dischargeable positions adjacent in the Y direction. Hereinafter, the output operation by the upstream-side recording element which is not continuous is also referred to as the isolated output operation. For example, at the position X1 in the X direction in FIG. 5, the isolated output operation is performed by the upstream-side recording element four times, and the output operation is performed by the downstream-side recording element twice or more continuously at the ink dischargeable positions where the output operation by the upstream-side recording element is not performed.

The graph in the lower section of FIG. 5 shows the operation rates each of which is a rate of the output operation performed by the recording element in the upstream-side recording head 242U or the downstream-side recording head 242D at each position in the X direction. In the graph, the operation rate of the upstream-side recording head 242U (upstream-side operation rate) is shown by the dotted line, and the operation rate of the downstream-side recording head 242D (downstream-side operation rate) is shown by the solid line.

In the embodiment, the downstream-side operation rate in the overlapping range R is determined to simply increase according to the increase in the distance from the end of the arrangement range of the recording elements 243 in the downstream-side recording head 242D. The upstream-side operation rate is determined such that the sum of the upstream-side operation rate and the downstream-side operation rate at each position in the X direction is 1. Accordingly, the upstream-side operation rate is determined to simply decrease according to the increase in the distance from the end of the downstream-side recording head 242D in the overlapping range R.

Each of the recording elements 243 of each recording element pair 243p performs the output operation at a frequency according to the operation rate at the position in the X direction of the recording element pair 243p.

In detail, as shown in the upper section in FIG. 5, for the recording element pair 243p provided at an end position on the end side of the downstream-side recording head 242D in the overlapping range R, the order of the output operation by each of the recording elements 243 in the recording element pair 243p is set such that the upstream-side operation rate is 0.8 (downstream-side operation rate is 0.2). As the distance from the end of the downstream-side recording head 242D increases, the frequency of the output operation by the recording element 243 in the upstream-side recording head 242U decreases, and the frequency of the output operation by the recording element 243 in the downstream-side recording head 242D increases. For the recording element pair 243p provided at the end position on the side opposite to the end side of the downstream-side recording head 242D in the overlapping range R, the order of the output operation by each of the recording elements 243 in the recording element pair 243p is set such that the upstream-side operation rate is 0.2 (downstream-side operation rate is 0.8).

The position in the Y direction where the recording element 243 to perform the output operation is switched, that is, the timing to switch the recording element 243 which performs the output operation, is different for each of the recording element pairs 243p which are adjacent in the X direction. Furthermore, the order of the output operation by each of the recording elements 243 in each recording element pair 243p is set such that the recording element 243 to perform the output operation is switched at a random position (phase of the switching of recording element 243) in the Y direction over the entire overlapping range R.

In order to perform such complementary ink discharging, in the inkjet recording device 1, there is generated mask image data in which a part of pixel data is changed to pixel data corresponding to the non-discharging of ink by applying predetermined mask pattern data having a mask pattern corresponding to each pattern of output operation of the recording element 243 in the upstream-side recording head 242U and the downstream-side recording head 242D to the portion corresponding to the overlapping range R in the above-mentioned partial image data. Then, the mask image data is supplied to each of the upstream-side recording head 242U and the downstream-side recording head 242D, and thereby the complementary output operation as shown in FIG. 5 is performed in the overlapping range R. The generation of mask image data and the supply to the recording head 242 are performed for each line (pixel line) of image data.

Next, the solidified state of ink discharged onto the recording medium P in the overlapping range R and the gloss of the recorded image according to the solidified state of the ink will be described.

In the inkjet recording device 1, ink is discharged from the upstream-side recording head 242U to a same position in the Y direction of the recoding medium P conveyed in the Y direction by the conveyance drum 21, and thereafter, ink is discharged from the downstream-side recording head 242D with a time difference according to the distance in the Y direction between the upstream-side recording head 242U and the downstream-side recording head 242D. In the embodiment, the time difference of adhering onto the recording medium P of the ink discharged in the above way is approximately a hundred to a hundred and several tens of milliseconds. Since the ink which adhered to the recording medium P is solidified in approximately 50 to 100 milliseconds, in the region corresponding to the overlapping range R in the recording medium P, the ink to be discharged from the downstream-side recording head 242D is discharged and solidified after the ink discharged from the upstream-side recording head 242U is solidified.

The ink which was discharged by the above-mentioned isolated output operation in the output operation of the upstream-side recording element is easily solidified in a flat shape as shown in FIG. 4C by combining with the ink discharged by another output operation of the upstream-side recording element. In order to easily generate such a combination of ink discharged by the isolated output operation, in the embodiment, the execution order of the output operations of the upstream-side recording element and the downstream-side recording element is determined such that the ink adhering position (first adhering position) on the recording medium P by the isolated output operation of the upstream-side recording element and the ink adhering position (second adhering position) by another output operation of any upstream-side recording element are located within a distance range where the ink droplets adhering to the respective adhering positions are combined with each other. In detail, as shown in FIG. 5, each position of ink adhering by the upstream-side recording element is set such that the distance from another position of ink adhering by the upstream-side recording element is three times or less the interval of ink dischargeable positions. Thus, the ink discharged by the upstream-side recording element is easily solidified in a flat shape.

The ink discharged by the output operation of the downstream-side recording element adheres onto the flat ink after solidification formed by the upstream-side recording element, or directly adheres onto the surface of the recording medium P and is solidified. The output operation of the downstream-side recording element is performed continuously to two or more ink dischargeable positions in the Y direction, thus leading to a high possibility that the high diffusion discharging pattern made by the halftone processing is directly reflected and appears. The surface shape of the ink which was solidified and fixed by such a pattern is directly reflected in the surface shape of the ink in the overlapping range R. Thus, it is possible to make the surface shape of the ink in the overlapping range R and the surface shape of the ink in the non-overlapping range close to each other, and the unevenness in gloss between the overlapping range R and the non-overlapping range is effectively suppressed.

Next, the control procedure by the CPU 41 of image recording processing executed by the inkjet recording device 1 will be described.

FIG. 6 is a flowchart showing a control procedure of image recording processing.

The image recording processing is executed when a print job and image data are input to the controller 40 from the external device 2 via the input/output interface 53, for example.

When the image recording processing is started, the CPU 41 applies mask pattern data, in which the pattern of output operation determined in the overlapping range R of each of the recording heads 242 is reflected, to the pixel data for one line among each piece of the partial image data supplied to each of the recording heads 242 of the head unit 24 in the image data. The CPU 41 generates line image data (mask image data) to be supplied to each of the recording heads 242 of the head unit 24 (step S101).

The CPU 41 causes the head unit 24 to discharge ink and record the portion corresponding to the one line in the image, on the basis of the line pixel data generated in step S101 (step S102: recording step). That is, the CPU 41 outputs a control signal to the conveyance driver 52 and causes the conveyance driver 52 to rotate the conveyance drum 21 and convey the recording medium P. The CPU 41 supplies a control signal including line image data to the recording head driver 241 and causes the recording head driver 241 to output the drive signal to the recording heads 242 at a timing which is appropriate according to the rotation of the conveyance drum 21. Thereby, the CPU 41 causes the recoding elements 243 of the head unit 24 to discharge the ink onto the recording medium P conveyed by the conveyance drum 21 to record a part of the image on the recording medium P.

The CPU 41 determines whether recording has finished for the entire image of the recording target (step S103). If it is determined that there is a portion which is not recorded (step S103: NO), the CPU 41 proceeds to step S101, and executes the processing for the line next to the line which was processed in step S101 performed last in the image data.

If it is determined that recording has finished for the entire portion of the image of the recording target (step S103: YES), the CPU 41 conveys the recording medium P to the sheet ejector 30 (step S104).

When the processing of step S104 is finished, the CPU 41 ends the image recording processing.

The above image recording processing is processing for one head unit 24, and the CPU 41 executes, in parallel, the above image recording processing to each of the four head units 24 corresponding to Y, M, C and K.

As described above, an inkjet recording device 1 according to the embodiment includes: a head unit 24 that discharges ink, which changes a phase between a solid and a liquid, to a recording medium P from a plurality of recording elements 243 that are provided in each of a plurality of recording heads 242; a conveyance drum 21 that moves the recording medium P and the plurality of recording heads 242 relative to each other; and a CPU 41. The CPU 41 performs recording control of causing each of the plurality of recording elements 243 provided in each of the plurality of recording heads 242 to sequentially perform an output operation that is a discharging operation or a non-discharging operation of the ink to each position in the Y direction of the recording medium P while causing the conveyance drum 21 to move the recording medium P in the Y direction relative to the plurality of recording heads 242 (recording control means). The plurality of recording elements 243 are provided at an even arrangement interval in the X direction orthogonal to the Y direction in each of the plurality of recording heads 242. Each of the plurality of recording heads 242 is arranged such that an arrangement range in the X direction of the recording elements 243 overlaps, in an overlapping range R that is a predetermined neighborhood range from an end of the arrangement range, with an arrangement range of recording elements 243 in another recording head 242, and a pair of recording heads 242 having recording elements 243 in overlapping arrangement ranges in the overlapping range R are located at positions different from each other in the Y direction. The ink that is discharged by the head unit 24 and adheres to the recording medium P changes the phase to the solid in a time shorter than a difference between times when the ink, which is discharged from the recording elements belonging to respective recording heads of the pair of recording heads, adheres to a same position in the Y direction on the recording medium P in the recording control. The CPU 41 selects a recording element 243 among recording elements 243 at corresponding positions in the X direction in the respective recording heads of the pair of recording heads 242 and performs the recording control of causing the selected recording element 243 to perform the output operation to each position in the Y direction of the recording medium P in the overlapping range R. In the recording control, the CPU 41 determines an execution order of output operations by downstream-side recording elements and upstream-side recording elements at corresponding positions in the X direction such that the output operation by each of the downstream-side recording elements is performed twice or more continuously and at least a part of the output operations by the upstream-side recording elements is not continuous, the downstream-side recording elements belonging to the downstream-side recording head 242D located on a downstream side in the Y direction among the pair of recording heads 242, and the upstream-side recording elements belonging to the upstream-side recording head 242U located on an upstream side in the Y direction among the pair of recording heads 242 (recording control means).

In such a way, by causing at least a part of the output operations by the upstream-side recording elements not to be continuous, the freedom degree of the pattern of the output operation by each of the downstream-side recording elements can be improved. As a result, it is possible to make the surface shape of the ink in the overlapping range R close to the surface shape of the ink in the non-overlapping range, the surface shape of the ink in the overlapping range R being determined by the shape of ink which was discharged from the downstream-side recording elements and solidified. Thus, it is possible to suppress the generation of unevenness in gloss between the overlapping range R and the non-overlapping range.

The continuous output operation to the positions adjacent in the Y direction by the downstream-side recording element in the overlapping range R reduces the portion where the ink droplets overlap or separate from each other, the ink droplets being discharged to the ink dischargeable positions adjacent to each other in the Y direction by the upstream-side recording element and the downstream-side recording element, when the conveyance speed of the recording medium P is changed or the recording medium P vibrates during image recording Thus, it is possible to suppress the unevenness in density and the generation of periodic gloss change caused by the change in the conveyance speed and the vibration of the recording medium P.

The CPU 41 selects the recording element 243 to perform the output operation such that an operation rate, which is a rate of the output operation performed by a recording element 243 in one recording head 242 among the pair of recording heads 242, simply increases in the overlapping range R according to increase in a distance from an end of the overlapping range R in the one recording head 242. Thus, since the change amount of the operation rate by the recording element 243 in each of the recording heads 242 can be small between the portions respectively corresponding to the overlapping range R and the non-overlapping range in the recorded image, it is possible to suppress the unevenness in density between the portions respectively corresponding to the overlapping range R and the non-overlapping range.

The CPU 41 switches, at a different timing, the recording element 243 to perform the output operation at each of positions adjacent in the X direction in the overlapping range R (recording control means). Thus, since the border position of ink discharged from each of the upstream-side recording element and the downstream-side recording element is dispersed in the Y direction, it is possible to make the unevenness in gloss and unevenness in density less noticeable, the unevenness in gloss and unevenness in density being caused by misalignment in the Y direction of the upstream-side recording head 242U and the downstream-side recording head 242D, variation in the discharging amount and discharging direction of ink, and the like.

The CPU 41 determines the execution order of the output operations such that a first adhering position and any second adhering position other than the first adhering position are located in a distance range where the ink that adheres to the first adhering position and the ink that adheres to the second adhering position are combined with each other, the first adhering position being a position to which the ink adheres on the recording medium P when the ink is discharged by the output operation that is not continuous by an upstream-side recording element, and the second adhering position being a position to which the ink adheres by the output operation of any of the upstream-side recording elements (recording control means).

Thus, it is possible to spread the ink discharged by the upstream-side recording elements in a wide range, and solidify and fix the ink in a flat shape. Then, since the ink discharged by the downstream-side recording element adheres to overlap the ink in the flat shape which was formed in such a way, it is possible to solidify and fix the adhering ink in a desired shape (for example, the shape close to the shape of ink in the non-overlapping range).

The CPU 41 causes the conveyance drum 21 to move the recording medium P and the plurality of recording heads 242 relative to each other at a relative movement speed that makes a time, which is required for relative movement of a position opposing the upstream-side recording element on the recording medium P to a position opposing the downstream-side recording element along the Y direction, longer than a time until a phase change to the solid of the ink that is discharged by the upstream-side recording element and adheres to the recording medium P (recording control means). Thus, it is possible to discharge ink by the downstream-side recording element after solidification of the ink which was discharged by the upstream-side recording element and adhered onto the recording medium P. Thus, it is possible to reflect the shape of the ink, which was discharged by the downstream-side recording element and solidified and fixed, in the shape of the ink in the overlapping range R more surely.

An inkjet recording method by an inkjet recording device 1 according to the embodiment is an inkjet recording method by the inkjet recording device 1 that includes: a head unit 24 that discharges ink, which changes a phase between a solid and a liquid, to a recording medium P from a plurality of recording elements 243 that are provided in each of a plurality of recording heads 242; and a conveyance drum 21 that moves the recording medium P and the plurality of recording heads 242 relative to each other. The method includes: a recording step that is performing recording control of causing each of the plurality of recording elements 243 provided in each of the plurality of recording heads 242 to sequentially perform an output operation that is a discharging operation or a non-discharging operation of the ink to each position in the Y direction of the recording medium P while causing the conveyance drum 21 to move the recording medium P relative to the plurality of recording heads 242 in the Y direction. The plurality of recording elements 243 in the inkjet recording device 1 are provided at an even arrangement interval in the X direction orthogonal to the Y direction in each of the plurality of recording heads 242. Each of the plurality of recording heads 242 is arranged such that an arrangement range in the X direction of the recording elements 243 overlaps, in an overlapping range R that is a predetermined neighborhood range from an end of the arrangement range, with an arrangement range of recording elements 243 in another recording head 242, and a pair of recording heads 242 having recording elements 243 in overlapping arrangement ranges in the overlapping range R are located at positions different from each other in the Y direction. The ink that is discharged by the head unit 24 and adheres to the recording medium P changes the phase to the solid in a time shorter than a difference between times when the ink, which is discharged from the recording elements belonging to respective recording heads of the pair of recording heads, adheres to a same position in the Y direction on the recording medium P in the recording control. In the recording step, a recording element 243 among recording elements 243 at corresponding positions in the X direction in the respective recording heads of the pair of recording heads 242 is selected, and the recording control is performed to cause the selected recording element to perform the output operation to each position in the Y direction of the recording medium P in the overlapping range R, and in the recording control, an execution order of output operations by downstream-side recording elements and upstream-side recording elements at corresponding positions in the X direction is determined such that the output operation by each of the downstream-side recording elements is performed twice or more continuously and at least a part of the output operations by the upstream-side recording elements is not continuous, the downstream-side recording elements belonging to the downstream-side recording head 242D located on a downstream side in the Y direction among the pair of recording heads 242, and the upstream-side recording elements belonging to the upstream-side recording head 242U located on an upstream side in the Y direction among the pair of recording heads 242. Thus, since the freedom degree of the pattern of output operation by the downstream-side recording element can be improved, it is possible to suppress the generation of unevenness in gloss between the overlapping range R and the non-overlapping range by making the surface shape of the ink in the overlapping range R close to the surface shape of the ink in the non-overlapping range, the surface shape of the ink in the overlapping range R being determined by the shape of the ink which was discharged from the downstream-side recording element and solidified. It is also possible to suppress the generation of unevenness in density and periodical change in gloss caused by the change in the conveyance speed and the vibration of the recording medium P.

The present invention is not limited to the above embodiment and each modification example, and various changes can be made.

For example, the embodiment has been explained by using an example in which the recording elements 243 are located at positions matching each other in the X direction in the overlapping range R in respective recording heads 242 of a pair of recording heads having recording elements 243 in the overlapping range R. However, the recording elements 243 in the pair of recording heads 242 in the overlapping range R may be located at positions different from each other in the X direction. In this case, the complementary ink discharging may be performed by the recording elements 243 located at the positions corresponding to each other in the X direction among the recoding elements 243 in the respective recording heads 242 of the pair of recording heads.

The embodiment has been described by using an example in which mask pattern data is applied to partial image data for one line by the CPU 41, and a drive signal is supplied to the recording element 243 from the recording head driver 241 according to the sequentially obtained mask image data. However, the present invention is not limited to this. For example, the controller 40 may repeatedly execute the operation of applying the mask pattern data to a part of the partial image data for the entire image data, generate mask image data corresponding to the entire partial image data and store the generated data in the storage 44. The mask image data may be generated in the external device 2 and supplied to the controller 40 via the input/output interface 53.

The embodiment has been described by using an example in which the entire range in the X direction of the overlapping range R is set as a set range and the complementary output operation is performed by each of the recording elements 243 in the set range. However, the present invention is not limited to this. For example, the downstream-side print rate may be 0 at a part of the end side of the downstream-side recording heads 242D in the overlapping range R to cause only the recording element 243 in the upstream-side recording head 242U to perform the output operation, and the remaining range of the overlapping range R may be set as the set range. The downstream-side print rate may be 1 at a part of the side opposite to the end side of the downstream-side recording head 242D in the overlapping range R to cause only the downstream-side recording head 242D to perform the output operation, and the remaining range of the overlapping range R may be set as the set range. The downstream-side print rate may be 0 at a part of the end side of the downstream-side recording heads 242D and the downstream-side print rate may be 1 at a part of the side opposite to the end side in the overlapping range R, and the remaining range of the overlapping range R may be set as the set range.

The embodiment has been explained by using an example of simply increasing or decreasing the operation rate of each of the recording heads 242 in the X direction in the overlapping range R. However, the operation rate may be constant in the overlapping range R, or may be set to change in a manner other than the simple increase and simple decrease.

The embodiment has been described by taking an example of using ink which changes the phase to sol or gel according to the temperature. However, the present invention is not limited to this. Various inks which are solidified on the recording medium P immediately after adhering onto the recording medium P can be used.

The embodiment has been described by taking an example of hardening the ink and fixing the ink onto the recording medium P by emitting light such as ultraviolet rays from the fixer 25. However, the present invention is not limited to this. For example, a thermosetting ink may be used such that the ink is heated and hardened by emitting infrared rays (heat rays) as energy rays from the fixer 25 and the ink is fixed onto the recording medium P.

The embodiment has been described by taking, as an example, the conveyance drum 21 as the moving means. However, the present invention is not limited to this. For example, the moving means may have a belt which is supported by the two rollers and moves with respect to the rollers by rotating around the two rollers according to the rotation of the rollers, and the recording medium P may be placed on the conveyance surface of the belt.

The embodiment has been described by taking, as an example, the inkjet recording device 1 which records an image by the line head with the recording elements 243 arranged over the recording range of the image in the X direction on the recording medium P. However, the present invention may be applied to the inkjet recording device which performs image recording while causing the recording head to perform scanning movement. IN this case, the mechanism of causing the recording head to perform the scanning movement forms the moving means.

Though several embodiments of the present invention have been described above, the scope of the present invention is not limited to the above embodiments, and includes the scope of inventions, which is described in the scope of claims, and the scope equivalent thereof.

INDUSTRIAL APPLICABILITY

The present invention can be used in an inkjet recording device and an inkjet recording method.

REFERENCE SIGNS LIST 1 inkjet recording device
2 external device
10 sheet feeder 11 sheet feeding tray
12 medium carrier
20 image recorder
21 conveyance drum
22 hand-over unit
23 heater
24 head unit
241 recording head driver
242 recording head
242D downstream-side recording head
242U, 242Ua, 242Ub upstream-side recording head
243 recording element
243p recording element pair
244 ink heater
25 fixer
26 deliverer
30 sheet ejector
31 sheet ejection tray
40 controller
41 CPU
42 RAM
43 ROM
44 storage
51 image processor
52 conveyance driver
53 input/output interface
54 bus
Ia, Ib ink
P recording medium
P1 to p3 ink dischargeable position
R overlapping range

The invention claimed is:

1. An inkjet recording device comprising:
a recorder that discharges ink, which changes a phase between a solid and a liquid, to a recording medium from a plurality of recording elements that are provided in each of a plurality of recording heads;
a mover that moves the recording medium and the plurality of recording heads relative to each other; and
a hardware processor that performs recording control of causing each of the plurality of recording elements provided in each of the plurality of recording heads to sequentially perform an output operation that is a discharging operation or a non-discharging operation of the ink to each position in a predetermined movement direction of the recording medium while the hardware processor causes the mover to move the recording medium relative to the plurality of recording heads in the predetermined movement direction, wherein
the plurality of recording elements are provided at an even arrangement interval in a width direction orthogonal to the predetermined movement direction in each of the plurality of recording heads,
each of the plurality of recording heads is arranged such that an arrangement range in the width direction of the recording elements overlaps, in a predetermined neighborhood range from an end of the arrangement range, with an arrangement range of recording elements in another recording head, and a pair of recording heads having recording elements in overlapping arrangement ranges in a neighborhood range are located at positions different from each other in the predetermined movement direction,
the ink that is discharged by the recorder and adheres to the recording medium changes phase to solid in a time shorter than a difference between times when the ink, which is discharged from the recording elements belonging to respective recording heads of the pair of recording heads, adheres to a same position in the predetermined movement direction on the recording medium in the recording control,
the hardware processor selects a recording element among recording elements at corresponding positions in the width direction in the respective recording heads of the pair of recording heads and performs the recording control of causing the selected recording element to perform the output operation to each position in the predetermined movement direction of the recording medium in a predetermined set range in the width direction in the neighborhood range, and
in the recording control, the hardware processor determines an execution order of output operations by downstream-side recording elements and upstream-side recording elements at corresponding positions in the width direction such that the output operation by each of the downstream-side recording elements is performed twice or more continuously and at least a part of the output operations by the upstream-side recording elements are not performed twice or more continuously, the downstream-side recording elements belonging to the recording head located on a downstream side in the predetermined movement direction among the pair of recording heads, and the upstream-side recording elements belonging to the recording head located on an upstream side in the predetermined movement direction among the pair of recording heads.

2. The inkjet recording device according to claim 1, wherein the hardware processor selects the recording element to perform the output operation such that an operation rate, which is a rate of the output operation performed by a recording element in one recording head among the pair of recording heads, simply increases in the neighborhood range according to increase in a distance from an end of the neighborhood range in the one recording head.

3. The inkjet recording device according to claim 1, wherein the hardware processor switches, at a different timing, the recording element to perform the output operation at each of a plurality of adjacent positions in the width direction in the set range.

4. The inkjet recording device according to claim 1, wherein the hardware processor determines the execution order of the output operations such that a first adhering position and any second adhering position other than the first adhering position are located in a distance range where the ink that adheres to the first adhering position and the ink that adheres to the second adhering position are combined with each other, the first adhering position being a position to which the ink adheres on the recording medium when the ink is discharged by the output operation that is not continuous by an upstream-side recording element, and the second adhering position being a position to which the ink adheres by the output operation of any of the upstream-side recording elements.

5. The inkjet recording device according to claim 1, wherein the hardware processor causes the mover to move the recording medium and the plurality of recording heads relative to each other at a relative movement speed that makes a time, which is required for relative movement of a position opposing an ink discharging port of the upstream-side recording element on the recording medium to a position opposing an ink discharging port of the downstream-side recording element along the predetermined movement direction, longer than a time until a phase change to solid of the ink that is discharged by the upstream-side recording element and adheres to the recording medium.

6. An inkjet recording method by an inkjet recording device that includes: a recorder that discharges ink, which changes a phase to a solid immediately after adhering to a recording medium, from a plurality of recording elements that are provided in each of a plurality of recording heads to the recording medium; and a mover that moves the recording medium and the plurality of recording heads relative to each other, the method comprising:

a recording step that is performing recording control of causing each of the plurality of recording elements provided in each of the plurality of recording heads to sequentially perform an output operation that is a discharging operation or a non-discharging operation of the ink to each position in predetermined movement direction of the recording medium while causing the mover to move the recording medium relative to the plurality of recording heads in the predetermined movement direction, wherein the plurality of recording elements in the inkjet recording device are provided at an even arrangement interval in a width direction orthogonal to the predetermined movement direction in each of the plurality of recording heads, each of the plurality of recording heads in the inkjet recording device is arranged such that an arrangement range in the width direction of the recording elements overlaps, in a predetermined neighborhood range from an end of the arrangement range, with an arrangement range of recording elements in another recording head, and a pair of recording heads having recording elements in overlapping arrangement ranges in a neighborhood range are located at positions different from each other in the ene predetermined movement direction, the ink that is discharged by the recorder and adheres to the recording medium changes phase to solid in a time shorter than a difference between times when the ink, which is discharged from the recording elements belonging to respective recording heads of the pair of recording heads, adheres to a same position in the predetermined movement direction on the recording medium in the recording control, in the recording step, a recording element among recording elements at corresponding positions in the width direction in the respective recording heads of the pair of recording heads is selected, and the recording control is performed to cause the selected recording element to perform the output operation to each position in the predetermined movement direction of the recording medium in a predetermined set range in the width direction in the neighborhood range, and in the recording control in the recording step, an execution order of output operations by downstream-side recording elements and upstream-side recording elements at corresponding positions in the width direction is determined such that the output operation by each of the downstream-side recording elements is performed twice or more continuously and at least a part of the output operations by the upstream-side recording elements are not performed twice or more continuously, the downstream-side recording elements belonging to the recording head located on a downstream side in the predetermined movement direction among the pair of recording heads, and the upstream-side recording elements belonging to the recording head located on an upstream side in the predetermined movement direction among the pair of recording heads.

* * * * *